(12) United States Patent
Kimura

(10) Patent No.: US 10,087,048 B2
(45) Date of Patent: Oct. 2, 2018

(54) ELEVATOR SYSTEM

(71) Applicant: TOSHIBA ELEVATOR KABUSHIKI KAISHA, Kawasaki-shi, Kanagawa (JP)

(72) Inventor: Sayumi Kimura, Kanagawa (JP)

(73) Assignee: TOSHIBA ELEVATOR KABUSHIKI KAISHA, Kawasaki-shi (JP)

( * ) Notice: Subject to any disclaimer, the term of this patent is extended or adjusted under 35 U.S.C. 154(b) by 56 days.

(21) Appl. No.: 15/404,548

(22) Filed: Jan. 12, 2017

(65) Prior Publication Data
US 2017/0197808 A1    Jul. 13, 2017

(30) Foreign Application Priority Data

Jan. 13, 2016    (JP) .............................. 2016-004832

(51) Int. Cl.
| | |
|---|---|
| H04N 7/18 | (2006.01) |
| H04N 9/47 | (2006.01) |
| B66B 13/24 | (2006.01) |
| B66B 5/00 | (2006.01) |
| H04N 5/235 | (2006.01) |
| B66B 13/26 | (2006.01) |

(52) U.S. Cl.
CPC ............ *B66B 13/24* (2013.01); *B66B 5/0012* (2013.01); *B66B 5/0031* (2013.01); *B66B 13/26* (2013.01); *H04N 5/2353* (2013.01); *H04N 7/183* (2013.01)

(58) Field of Classification Search
None
See application file for complete search history.

(56) References Cited

U.S. PATENT DOCUMENTS

| | | | |
|---|---|---|---|
| 2008/0117020 A1* | 5/2008 | Martin | B66B 13/26 340/5.7 |
| 2013/0253974 A1* | 9/2013 | Mangalam | G06Q 10/06315 705/7.25 |
| 2014/0291552 A1* | 10/2014 | Schumacher | A47L 25/04 250/492.1 |
| 2018/0118519 A1* | 5/2018 | Fonteneau | B66B 11/0246 |

FOREIGN PATENT DOCUMENTS

| | | |
|---|---|---|
| JP | H11-261994 A | 9/1999 |
| JP | 11-286377 | 10/1999 |
| JP | 2002-293484 A | 10/2002 |
| JP | 2003-524813 A | 8/2003 |
| JP | 2005-179030 A | 7/2005 |
| JP | 2011-173671 A | 9/2011 |
| JP | 5201826 B2 | 6/2013 |
| JP | 2014-047015 A | 3/2014 |
| WO | WO-00/47511 A1 | 8/2000 |

* cited by examiner

Primary Examiner — Talha M Nawaz
(74) *Attorney, Agent, or Firm* — Foley & Lardner LLP

(57) ABSTRACT

In an elevator system according to one embodiment, an imaging unit performs an imaging operation to obtain an image of a hall, the doorway of a car and the vicinity of the doorway, a measuring unit measures an exposure amount of a specified detection area in the image, and a controller adjusts an exposure adjustment parameter of the imaging unit in accordance with the measured exposure amount. While the door is being opened, as the detection area, the controller specifies a detection area in the interior of the car, and notifies the measuring unit of the specified detection area, and while the door is being closed, as the detection area, the controller specifies a detection area in the hall, and notifies the measuring unit as the specified detection area.

11 Claims, 3 Drawing Sheets

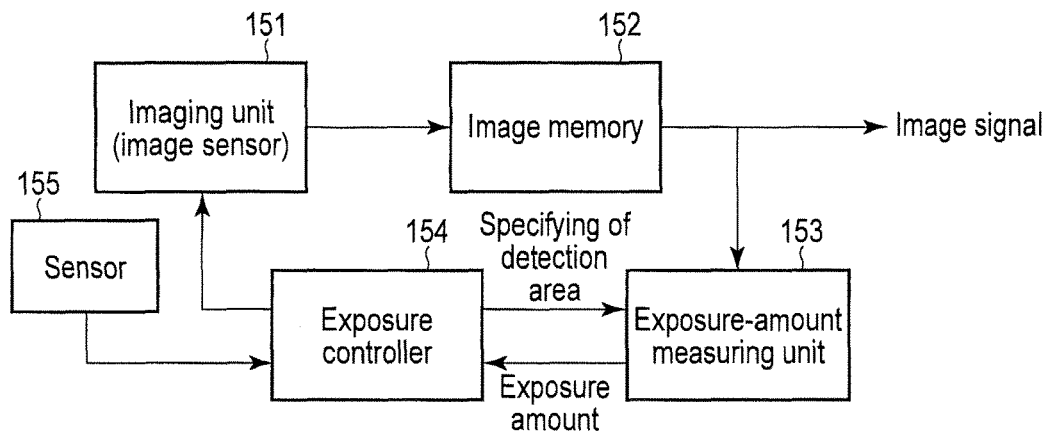
F I G. 3A
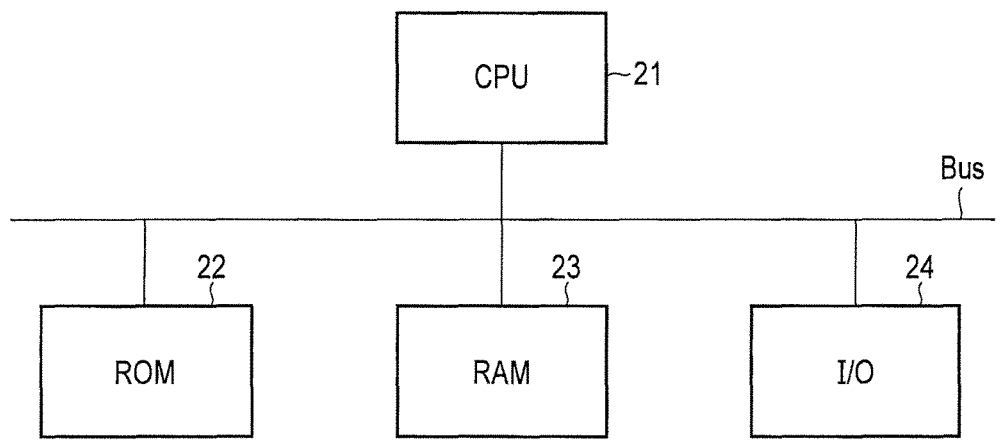
F I G. 3B
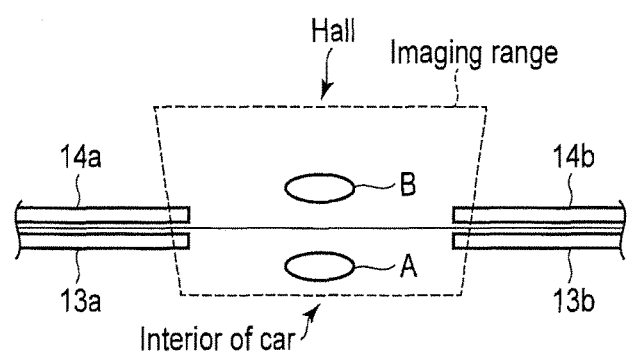
F I G. 4

ELEVATOR SYSTEM

CROSS-REFERENCE TO RELATED APPLICATIONS

This application is based upon and claims the benefit of priority from Japanese Patent Application No. 2016-004832, filed Jan. 13, 2016, the entire contents of which are incorporated herein by reference.

FIELD

Embodiments described herein relate generally to an elevator system which manages opening and closing of a door of an elevator.

BACKGROUND

In an elevator, a monitoring camera is installed above a doorway of a car, and performs an imaging operation to obtain an image of the doorway and vicinity thereof, and the obtained image is analyzed to check the state of a passenger or passengers who get into and/or off the car, in order to take countermeasures for ensuring safety when the door is opened/closed.

However, in an adjustment function of the monitoring camera, it is impossible to properly handle a change of an environment, especially, a change of the brightness which occurs when the door is opened/closed. Therefore, there is a possibility that an image having a lower quality will be obtained, and thus safety will not reliably be ensured when the door is opened/closed.

Therefore, in an imaging operation for the doorway and the vicinity thereof, it is required that the quality of an image obtained by the imaging operation when the door is opened/closed is improved, and more effective countermeasures for ensuring safety when the door is opened/closed are taken.

BRIEF DESCRIPTION OF THE DRAWINGS

FIG. 3A is a block diagram illustrating the entire configuration of the entire camera.

FIG. 3B is a block diagram illustrating a concrete configuration of a controller of the camera.

FIG. 4 is a view illustrating an imaging range of the camera as illustrated in FIGS. 3A and 3B and exposure detection areas as illustrated in FIGS. 3A and 3B.

DETAILED DESCRIPTION

Various embodiments will be described hereinafter with reference to the accompany drawings.

In general, according to one embodiment, there is provided an elevator system which includes: an imaging unit installed above a doorway of a car to perform an imaging operation to obtain an image of a hall, the doorway of the car and the vicinity of the doorway in an interior of the car; a measuring unit which measures an exposure amount of a specified detection area in the image obtained by the imaging unit; and a controller which adjusts an exposure adjustment parameter of the imaging unit in accordance with the exposure amount measured by the measuring unit, to execute a control such that the exposure amount of the detection area is set to a proper exposure value. In the elevator system, while the door is being opened, as the detection area, the controller specifies a detection area in the interior of the car, and notifies the measuring unit of the specified detection area; and while the door is being closed, as the detection area, the controller specifies a detection area in the hall, and notifies the measuring unit as the specified detection area.

An embodiment will be described with reference to the drawings.

Figure 1:
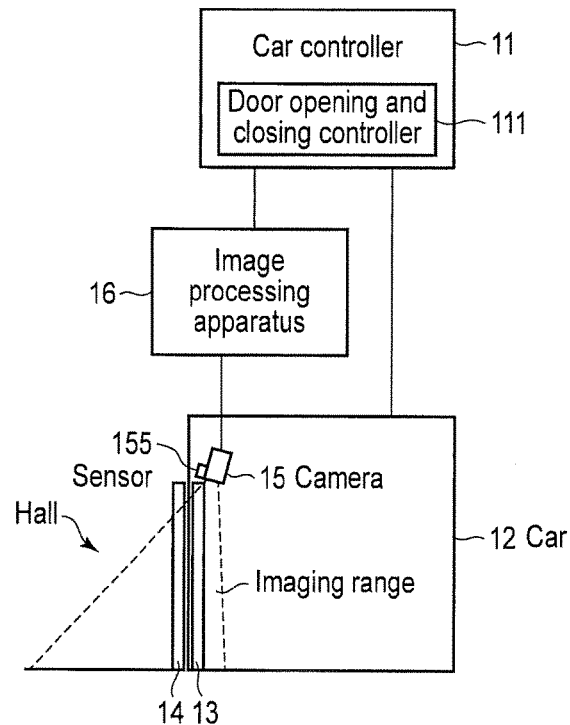
FIG. 1 is a block diagram illustrating a configuration of an elevator system according to an embodiment.

FIG. 1 is a block diagram illustrating a configuration of an elevator system according to the embodiment. It should be noted that the term "elevator" used herein basically means the car of an elevator.

In FIG. 1, reference numbers 11 and 12 denote a car controller and a car, respectively. The car controller 11 is connected to an elevator controller (not shown), and transmits and receives various kinds of signals such as a hall call and a car call to and from the elevator controller. It should be noted that in the hall of each of floors, hall call buttons (not shown) are installed, and the hall call means that a signal which includes information on a floor and a destination direction is registered in the elevator controller by operating any of the hall call buttons installed in the hall of the floor. The car call means that a call signal in the car 12, which includes information on a destination floor, is registered in the elevator controller by operating any of destination floor buttons (not shown) installed in the car 12.

The car controller 11 includes a door opening and closing controller 111. The door opening and closing controller 111 controls opening and closing of a car door 13 when the car 11 arrives at the hall. To be more specific, the door opening and closing controller 111 opens the car door 13 when the car 12 arrives at the hall, and then closes the car door 13 after a predetermined time elapses. However, while the car door 13 is fully open, if a person who appears to get into or the car 12 is detected by passenger-detection processing based on an image analysis by an image processing apparatus 16, the door opening and closing controller 111 inhibits closing of the car door 13 to keep the car door 13 open. Also, during closing of the car door 13, if a person who appears to get into or off the car 12 is detected, the door opening and closing controller 111 stops closing of the car door 13, and re-opens the car door 13.

Figure 2:
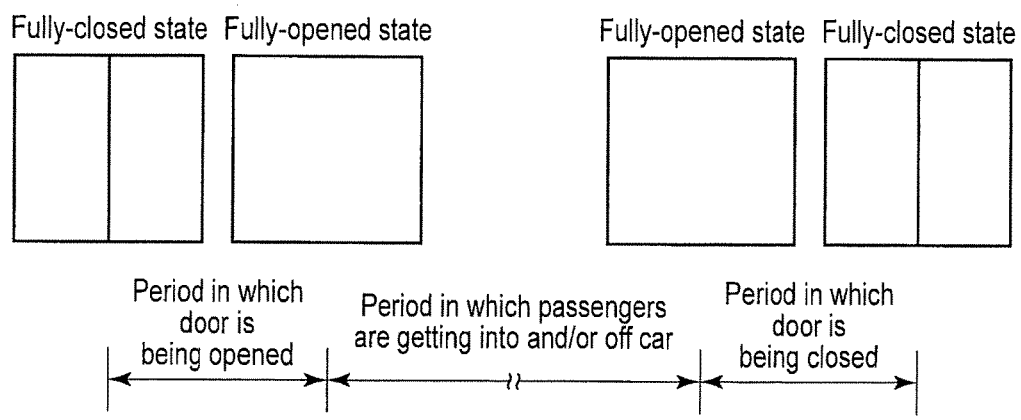
FIG. 2 is a view for explaining opening and closing operations of a car as illustrated in FIG. 1, which are performed when the car arrives at a hall.

It should be noted that in the hall of each floor, a hall door 14 is installed in a place where the car 12 will arrive, such that it is openable/closable. The hall door 14 is opened as engaged with the car door 13 when the car 11 arrives at the hall, and is then closed, kept engaged with the car door 13, after the predetermined time elapses. A power source (door motor) is provided in the car 12, and the hall door 14 is merely opened/closed in accordance with opening/closing of the car door 13. In the following explanation, it is assumed that when the car door 13 is fully open, the hall door 14 is also fully open, and when the car door 13 is fully closed, the hall door 14 is also fully closed. FIG. 2 illustrates opening and closing operations of the car 12 which are performed when the car 12 arrives at the hall.

In the embodiment, a monitoring camera 15 is installed above a doorway of the car 12, for example, at an inner portion of a modesty panel of the car door 13. The camera 15 can perform an imaging operation to obtain images of several frames per second, like a car-mounted camera. In the case where the car 12 arrives at each of the floors, the camera 15 performs an imaging operation to obtain images of the hall and the vicinity of the car door 13, which includes the interior of the car 12, in the following time periods: a time period in which the car door 13 performs its opening operation; a time period which the car door 13 is fully open to enable a passenger or passengers to get and/or off the car 12; and a time period in which the car door 13 performs its closing operation (see FIG. 4).

Each of images (video) obtained by the imaging operation performed by the camera 15 is subjected in real time to an analytical processing by the image processing apparatus 16. The image processing apparatus 16 extracts images of a moving object, for example, a person (a passenger who uses an elevator), and performs, for example, an analytical processing to follow the motion of the person, such as detection whether the person has completely gotten into or off the car 12, detection of whether the person is caught in a door pocket for the door when the door is opened, etc., and as occasion demands, for example, give an instruction to issue an alarm as security. It should be noted that in the example illustrated in FIG. 1, the image processing apparatus 16 is provided independent of the car controller 11; however, the car controller 11 may be formed to also have the function of the image processing apparatus 16.

FIG. 3A is a block diagram illustrating the entire configuration of the camera 15. In FIG. 3A, 151, 152, 153 and 154 denote an imaging unit, an image memory, an exposure-amount measuring unit and an exposure controller, respectively. FIG. 3B concretely illustrates the exposure controller 154.

The imaging unit 151 comprises an optical lens, an image sensor and an electronic shutter, although they are not illustrated in FIG. 3A. The imaging unit 151 forms an image on the image sensor with deep focus of the optical lens, adjusts exposure time by adjusting the shutter speed of the electronic shutter, and digitizes an image in units of one pixel. An image signal obtained in the imaging unit 151 is temporarily stored as data in the image memory 152, and then read from the imaging memory 152 in units of one frame, and sent to the image processing apparatus 16.

In response to an instruction issued by the exposure controller 154, the exposure-amount measuring unit 153 reads an image signal as data from the image memory 152, and measures an exposure amount of a specified one of a detection area in the interior of the car and a detection area in the hall.

The exposure controller 154 determines a fully-opened state of the car door 13 as an initial state, and instructs the exposure-amount measuring unit 153 to measure an exposure amount of the detection area of the interior of the car, which is registered in advance, and acquires an exposure-amount measurement value of the detection area. Then, the exposure controller 154 computes exposure time such that the acquired exposure-amount measurement value is proper (it may acquire a proper exposure time from a table which is prepared in advance to indicate exposure-amount measurement values and exposure times corresponding to proper values), and adjusts the shutter speed of the electronic shutter of the imaging unit 151 based on the computed exposure time. In the following, it is assumed that the above series of processes is exposure adjustment.

In the case where in the fully-closed state of the car door 13, the car controller 11 gives an instruction to open the car door 13, the exposure controller 154 causes the exposure-amount measuring unit 153 to continuously measure the exposure amount of the detection area in the interior of the car until the car door 13 is fully opened, and adjusts exposure based on the measured exposure amount.

When the car door 13 is fully opened, the exposure controller 154 instructs the exposure-amount measuring unit 153 to measure an exposure amount of the detection area in the hall, which is registered in advance. Furthermore, an exposure-amount measurement value of the detection area in the hall is acquired from the exposure-amount measuring unit 153, and exposure adjustment is carried out based on the exposure-amount measurement value.

In the case where the car door 13 starts to be closed from the fully-opened state of the car door 13, the exposure controller 154 causes the exposure-amount measuring unit 153 to continuously measure the exposure amount of the detection area in the hall until the car door 13 is fully closed, and adjusts exposure based on the measured exposure amount.

The exposure controller 154, as illustrated in FIG. 3B, comprises: a center processor unit (CPU) 21 which executes an arithmetic processing in accordance with an exposure adjustment program; a read-only memory (ROM) 22 which stores a program to be carried out by the CPU 21 and registration information (the detection area, an exposure time reference table, etc.); a random access memory (RAM) 23 which is a work area for use in execution of a program by the CPU 21; and an input/output (I/O) interface 24 which inputs the registration information, data on the measured exposure amount and an instruction to open the car door, and outputs an electronic-shutter drive signal corresponding to an exposure time for setting the measured exposure amount to a proper value.

Figure 5:
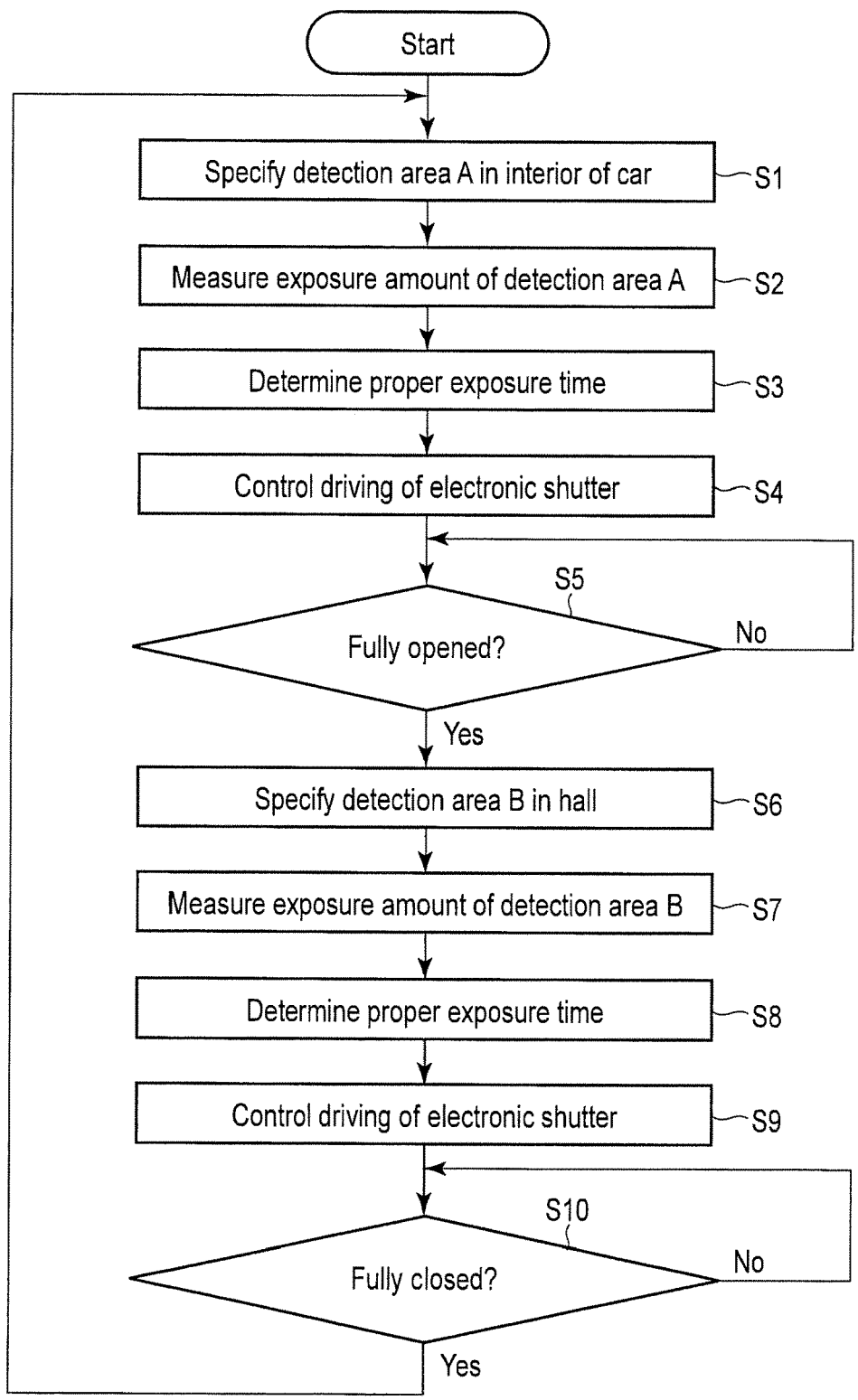
FIG. 5 is a flowchart indicating a flow of an exposure adjustment as illustrated in FIGS. 3A and 3B.

An exposure adjustment processing according to the embodiment, which is executed in the above structure, will be explained with reference to FIGS. 4 and 5. It should be noted that FIG. 4 is a view illustrating an imaging range of the camera 15 (i.e., the imaging range of the imaging unit 151), and FIG. 5 is a flowchart indicating the flow of a control executed by the exposure controller 154 of the camera 15.

In general, an ordinary camera is adjusted in exposure amount such that the brightness of the entire image displayed on its screen becomes optimum. However, since the hall is brighter than the interior of the car of the elevator, when the camera 15 is used in the interior of the car to perform an imaging operation, the exposure amount in the imaging range rapidly changes during opening/closing of the car door 13 to greatly differ from a proper exposure value, as a result of which clipped whites or crushed shadows are made in an area of an image which is to be detected, and they cause the image to be visibly unrecognizable. In view of the above, in the elevator system according to the embodiment, the position of a spot (detection area) for which exposure adjustment of the camera 15 is carried out is changed in accordance with opening/closing of the car door 13.

In FIGS. 4, 13*a* and 13*b* denote a car door, and 14*a* and 14*b* denote a hall door. It is assumed that when the car door 13 is in the fully-closed state or it is being opened, the imaging range of the camera 15 includes a range in which the car door and the vicinity thereof are located, and when the car door is in the fully-opened state, or it is being closed, the imaging range of the camera 15 includes a range of a hall side.

In the elevator system, when the car door 13 is being opened, in order to monitor whether a passenger is caught in the door pocket of the car door or not, a detection area A in the interior of the car which is located close to the doorway of the car as illustrated in FIG. 4 is determined as the detection area the exposure amount of which is to be detected, so that the imaging operation is performed on the interior of the car with a proper exposure. Furthermore, when the car door 13 is in the fully-opened state, or it is being closed, in order to monitor a passenger or passengers getting into or off the car, a detection area B in the hall which is located close to the doorway as illustrated in FIG. 4 is determined as the above detection area, so that the imaging operation is performed on the hall side with a proper exposure. It should be noted that the detection areas A and B are registered in advance.

In the camera 15, the exposure controller 154 executes control processing for such exposure adjustment as illustrated in FIG. 5. First, in the fully-closed state of the car door 13, the exposure controller 154 specifies the detection area A in the interior of the car in an image, as an exposure-amount measurement spot (step S1), acquires the result of measurement of an exposure amount of the detection area A (step S2), determines a proper exposure time based on the result of the measurement (step S3), and controls driving of the electronic shutter in accordance with the proper exposure time (step S4). When the car door 13 starts to be opened in response to inputting of an instruction to open the car door 13, the exposure controller 154 continues exposure adjustment for the detection area A in the interior of the car while the car door 13 is being opened, and waits for entrance of the car door 13 into the fully-opened state. When the car door 13 is fully opened, the exposure controller 154 determines the detection area B in the hall in an image as the exposure-amount measurement spot (step S6), acquires the result of measurement of the exposure amount of the detection area B (step S7), determines a proper exposure time based on the result of the measurement (step S8), and controls driving of the electronic shutter in accordance with the proper exposure time (step S9). The exposure controller 154 waits for ending of a fully-opened period in which the car door 13 is fully closed (step S10), and then when the fully-opened period ends and the car door 13 starts to be closed, the exposure controller 154 continues exposure adjustment for the detection area B in the hall while the car door 13 is being closed. When the car door 13 is fully closed, the step to be carried out is returned to step S1, and a series of steps as described above are repeatedly carried out.

As described above, in the embodiment, the detection area A in the car and the detection area B in the hall are set and registered in advance. Furthermore, when the car door 13 is in the fully-closed state, or it is being opened, an exposure value is set for the detection area A in the car. Thus, the imaging operation is performed on the interior of the car with a proper exposure, thus preventing clipped whites or crushed shadows from being made in an image of the interior of the car. Therefore, from the image, it is possible to reliably recognize whether a passenger is caught in the door pocket or not, and thus take countermeasures for ensuring safety. Furthermore, when the car door 13 is in the fully-opened state, or it is being closed, an exposure value is set for the detection area B in the hall. Thus, the imaging operation is performed on the doorway and the vicinity of the doorway in the hall with a proper exposure, thus preventing clipped whites from being made in an image of such a hall side as described. Therefore, from obtained images, it is possible to reliably recognize the state of a passenger or passengers getting into or off the car, and thus take countermeasures for ensuring safety when they are getting into or off the car.

According to the above embodiment, it is possible to provide an elevator system which can properly improve the quality of images of the doorway of the car and the vicinity of the doorway, which are obtained by an imaging operation, and thus more effectively take countermeasures to ensure safety when the car door is opened/closed.

It should be noted that in the above explanation of the embodiment, as a parameter for adjusting exposure, the exposure time to be adjusted by controlling the electronic shutter is described by way of example; however, the sensitivity of the image sensor, a frame interval, and a combination of them can also be applied to put the elevator system according to the embodiment into practice.

Furthermore, regarding the embodiment, the above explanation is given with respect to the case where the detection area for which exposure is to be adjusted is changed in accordance with an instruction to open the car door; however, it may be set that a state in which the car door 13 is fully closed, a state in which the car door 13 is being opened, a state in which the car door 13 is fully opened or a state in which the car door 13 is being closed is detected, and the detection area for which exposure is to be adjusted is switched based on the result of the above detection.

Furthermore, in the case where a proper exposure value can be set from the outside of the camera (the imaging unit), it may be set that the position of the door is detected, and the proper exposure value is fixed or changed based on the result of the detection. For example, when the car door 13 is being opened or closed, the proper exposure value is fixed, and when it is in the fully-opened state or the fully-closed state, the proper exposure value is changed such that the average value of luminance values of all areas of a screen (or part of the screen/the entire detection area/part of the detection area) falls within a predetermined range.

Furthermore, the exposure adjustment may be changed from one time zone to another. For example, in the case where the detection area is influenced by sunlight or the like, the exposure value is changed to a predetermined value in accordance with at least one of time (daytime/nighttime or the like) and seasons. Alternatively, the exposure adjustment is carried out with a learning function, and exposure setting is carried out to determine optimal exposure values by time (and season).

Furthermore, it is preferable that the exposure adjustment be performed such that the brightness value (for example, 0 to 255) regarding the detection area falls within a predetermined range (for example, the range of 110 to 140).

In addition, it is preferable that the exposure value be set in accordance with the color of the flooring of the hall of each floor. That is, since the color of the flooring of the hall is related to the exposure adjustment, exposure values are determined in accordance with the colors of the floorings of the floors, respectively.

Also, it is preferable that the exposure value be varied in accordance with a combination of the color of the flooring and time zone to be referred to. That is, since the exposure adjustment is influenced by the color of the flooring and sunlight, the exposure value is determined in accordance with the color of the flooring and time zone to be referred to.

In addition, as illustrated in FIGS. 1 and 3A, it may be set that using a sensor (for example, an infrared sensor or an illuminometer) 155 installed close to the camera (imaging unit) 15, information on the brightness of the hall side is acquired when the car door is opened, an optimal exposure value is calculated based on the brightness, and the exposure adjustment is controlled based on the exposure value.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An elevator system comprising:
    an imaging unit installed above a doorway of a car to perform an imaging operation to obtain an image of a hall, the doorway of the car and vicinity thereof in an interior of the car; and
    a measuring unit which measures an exposure amount of a specified detection area in the image obtained by the imaging unit; and
    a controller which adjusts an exposure adjustment parameter of the imaging unit in accordance with the exposure amount measured by the measuring unit, to execute a control such that the exposure amount of the detection area is set to a proper exposure value,
    wherein while the door is being opened, as the detection area, the controller specifies a detection area in the interior of the car, and notifies the measuring unit of the specified detection area; and while the door is being closed, as the detection area, the controller specifies a detection area in the hall, and notifies the measuring unit as the specified detection area.

2. The elevator system of claim 1, wherein the controller has a function of registering the detection area in the interior of the car and the detection area in the hall in advance.

3. The elevator system of claim 1, wherein the controller determines at least any of exposure time, sensitivity and a frame interval of the imaging unit as the exposure adjustment parameter.

4. The elevator system of claim 1, wherein the controller controls exposure adjustment in accordance with an instruction to open the door.

5. The elevator system of claim 1, wherein in a case where the imaging unit is allowed to be set externally with respect to an exposure value, the controller fixes or changes the proper exposure value in accordance with a position of the door.

6. The elevator system of claim 1, wherein the controller changes the proper exposure value in accordance with a change of at least one of time and seasons.

7. The elevator system of claim 6, wherein the controller changes the proper exposure value in accordance with a change of at least one of time and seasons.

8. The elevator system of claim 1, wherein the controller controls the exposure adjustment such that a brightness value of the detection area in the interior of the car and that of the detection area in the hall fall within a predetermined range.

9. The elevator system of claim 1, wherein the controller changes the proper exposure value in accordance with a color of a flooring of a hall of each floor.

10. The elevator system of claim 1, wherein the controller changes the proper exposure value in accordance with a combination of a time zone and a color of a flooring of a hall of each floor.

11. The elevator system of claim 1, further comprising:
    a sensor installed close to the imaging device to acquire data regarding a brightness of the hall when the door is opened,
    wherein the controller calculates a proper exposure value based on the data acquired by the sensor, and controls exposure adjustment based on the calculated proper exposure value.

* * * * *